United States Patent [19]

Ricketts et al.

[11] Patent Number: 5,041,059
[45] Date of Patent: Aug. 20, 1991

[54] CLEANING SYSTEM FOR A COMBINE

[75] Inventors: Jonathan E. Ricketts, Viola; Robert A. Matousek, Minooka, both of Ill.

[73] Assignee: J. I. Case Company, Racine, Wis.

[21] Appl. No.: 521,534

[22] Filed: May 10, 1990

[51] Int. Cl.⁵ ............................................. A01F 12/44
[52] U.S. Cl. ..................................... 460/101; 460/902
[58] Field of Search .................. 460/103, 85, 90, 100, 460/101, 102, 902

[56] References Cited

U.S. PATENT DOCUMENTS

| 3,109,433 | 11/1963 | Claas ................................... 460/100 |
| 3,797,502 | 3/1974 | Reed et al. . |
| 4,230,130 | 10/1980 | Staiert . |
| 4,412,549 | 11/1983 | Rowland-Hill . |
| 4,770,190 | 9/1988 | Barnett ............................... 460/102 |
| 4,869,272 | 9/1989 | Ricketts et al. ..................... 460/100 |

FOREIGN PATENT DOCUMENTS

| 1271443 | 11/1986 | U.S.S.R. ............................. 460/100 |
| 1412650 | 7/1988 | U.S.S.R. ............................. 460/102 |

Primary Examiner—Terry Lee Mellus
Attorney, Agent, or Firm—Dressler, Goldsmith, Shore, Sutker & Milnamow, Ltd.

[57] ABSTRACT

A cleaning system for a combine including at least one sieve located in a housing of the combine such that a flow of air from a fan mechanism is directed upwardly therethrough. The sieve includes a plurality of louvers which are are arranged relative to each other to define a first series of clean grain passages therebetween. A majority of the louvers define a series of openings which define a second series of openings which allow clean grain to pass therethrough and facilitate an increased flow of air therethrough to enhance separation of unwanted residue from clean grain.

8 Claims, 3 Drawing Sheets

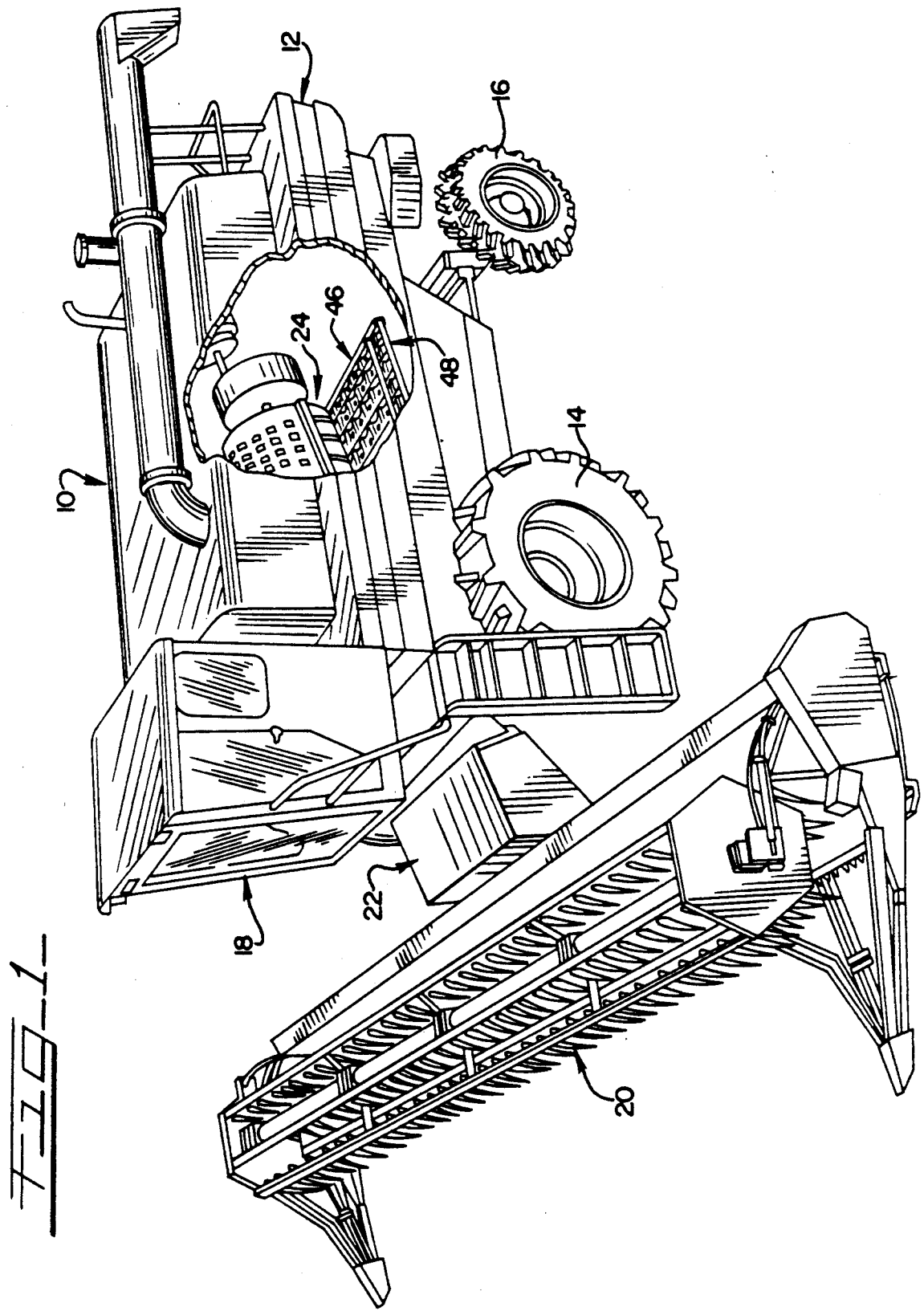

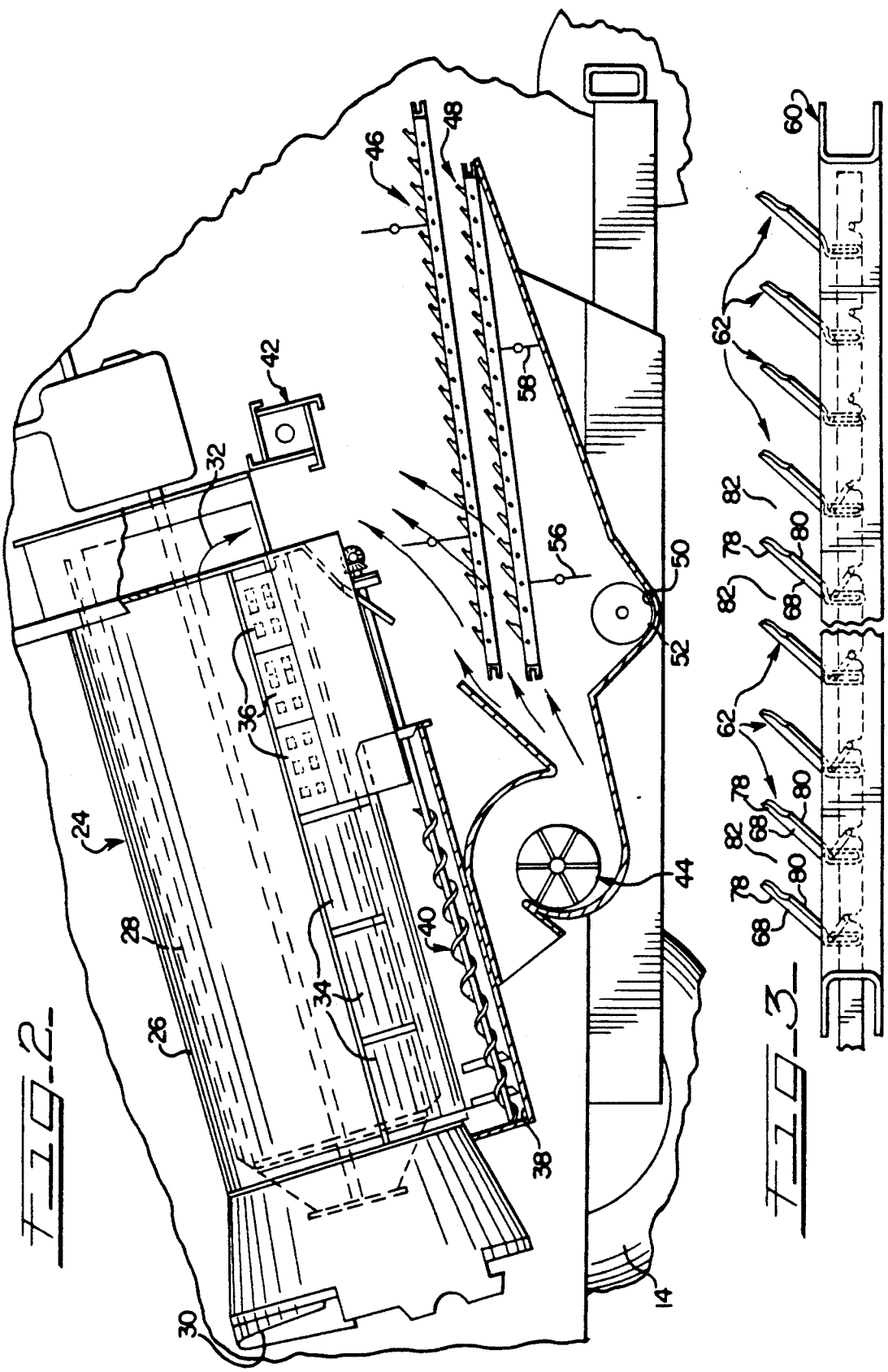

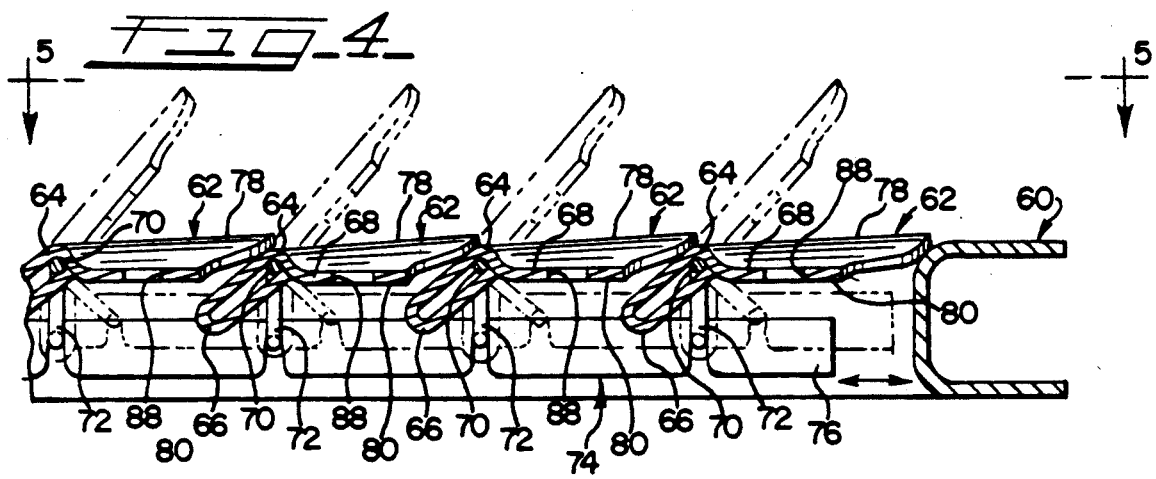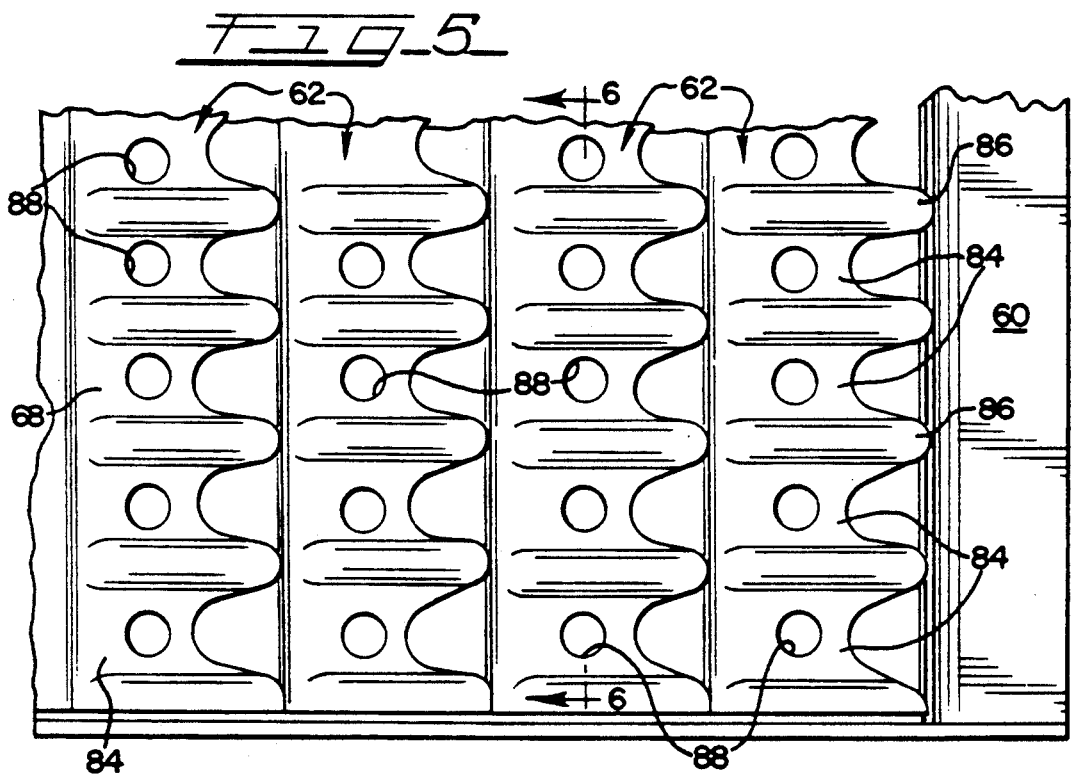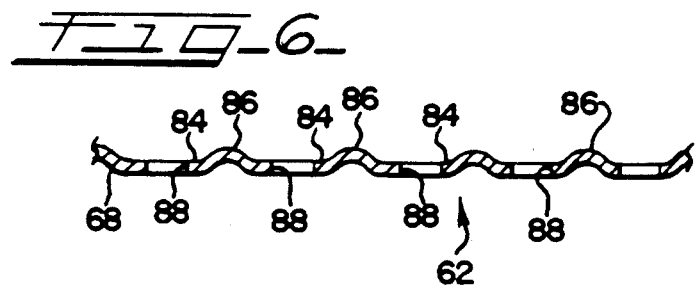

CLEANING SYSTEM FOR A COMBINE

FIELD OF THE INVENTION

The present invention generally relates to combines and, more particularly, to an improved cleaning sieve for combines.

BACKGROUND OF THE INVENTION

Combines are known in the art. They are available in various designs and models to perform the basic functions of harvesting, threshing, and cleaning of grain. As used herein, the term "grain" is meant to include corn, wheat, rye, oats, barley, flax seed, sorghum, soy beans, mixed grain, and any other food grains, feed grains, and oil seeds.

A typical combine includes a crop harvesting apparatus which reaps planted grain stalks. An infeed mechanism arranged at the forward end of the combine operates in combination with the harvesting apparatus and feeds the grain stalks to a separating apparatus. The separating apparatus threshes and separates the grain from the material other than grain.

While the separating apparatus acts to separate a substantial portion of the crop or grain from the material other than grain, some chaff and/or straw remains intermixed with the grain and a further cleaning or separating action is normally required. Further separation is normally achieved in a cleaning section of the combine.

The cleaning section of a conventional combine is located to receive grain and other material expelled from the separating apparatus. A typical cleaning section includes two reciprocally mounted sieves and a fan which produces a flow of air directed through the sieves. Reciprocation of the sieves facilitates arrangement of the grain and other materials into a crop layer or mat on top of the sieves. Each sieve preferably includes a series of adjacent louvers. A series of transversely elongated openings or passages is defined between the adjacent louvers to grade the material by size such that smaller kernels are allowed to fall through the openings but causing larger pieces of material to be moved rearward and off the sieves. The material moved off the sieves is returned to the separating apparatus for rethreshing.

Separation of the crop material is facilitated by the air from the fan flowing upwardly through the passages between the louvered sieves. The upwardly directed air creates a force which urges residue material including straw, chaff and the like to float on top of the sieve and into an airborne state such that it may be directed toward and expelled from a discharge end of the combine. The heavier seeds or clean grain tend to move to the sieve and fall through the openings or passages into a clean grain collector.

A substantial amount of chaff, straw and the like passes to the cleaning section of the combine from the separating apparatus. This forms a conglomerate mass of clean grain and chaff which is difficult to clean. As will be appreciated, the chaff acts to clog the sieve and, thereby, retard and sometimes inhibit clean grain from passing therethrough. As is evident from the prior art, considerable effort regarding fan design has been done over the years to produce an efficient flow of air which is necessary to provide a proper cleaning action for the threshed crop material.

To enhance versatility of the combine such that it can be used to harvest more than one type of grain, the louvers on the cleaning sieves are angularly adjustable relative to each other. The angular adjustability of the louvers allows the size of the openings or passages between adjacent louvers to be changed to control the size of the material that is allowed to fall through the passages or openings and thereby achieve the desired degree of material grading.

Successful operation of the prior art devices relies in large part on the proper opening between the louvers. If these openings are too small for the particular material being harvested, there is naturally a significant increase in the thickness of the layer of crop material on the sieves. Thus, the effectiveness of the fan is diminished. Moreover, a large portion of the clean grain is not allowed to pass through the sieve. Instead, the clean grain is moved off the rear of the sieve and repeated to the separating apparatus. The increase in material being repeated to the separating apparatus has an adverse effect on the productivity of the combine and enhances the opportunity for grain cracking. When the passages or openings between adjacent louvers are too small, harvester productivity is adversely effected because the ground speed of the harvester is necessarily reduced to inhibit excessive grain loss onto the ground.

On the other hand, if the openings or passages between the louvered sieves are too large, material other than grain passes into the collection chamber contaminating the clean grain sample. Sufficient contamination of the grain contained in the clean grain sample will cause a severe reduction in the price received for the grain when marketed. Accordingly, the openings between the louvers must be carefully regulated and controlled to inhibit the amount of material other than grain passing into the clean grain sample. Alternatively, the material other than grain can be mechanically removed or separated from the clean grain by a secondary operation away from the combine. As will be appreciated, such secondary operations are laborious, time consuming and, therefore, costly to the farmer.

The problem of separating material other than grain from clean grain is exacerbated in small grain cereal crop, especially wheat. Under certain climatic conditions, there is a tendency for the husk surrounding the grain to be tightly held to the kernel. This causes a condition known as "white caps" in the grain sample. These are grains that did not get thoroughly threshed in the separating apparatus, but did manage to fall into the clean grain portion of the harvester. Since the white caps are only slightly larger than the clean grain kernel, it is very hard to set the opening between the louvers to a dimension that will allow clean grain passage, but reject the white caps for return to rethreshing. This adjustment also necessitates microadjustments of the sieve opening that amount to changes of little more than a paper thickness. Of course, this fine an adjustment with the mechanism provided is very difficult and most frustrating.

The foregoing illustrates numerous problems and limitations of the known prior art mechanisms. Thus, it is apparent that it would be advantageous to provide cleaning sieves which facilitate air and grain flow therethrough while discerning between clean grain and material other than clean grain.

SUMMARY OF THE INVENTION

In view of the above, and in accordance with the present invention, there is provided an improved cleaning system including at least one cleaning sieve which provides a first and second series of clean grain passages for facilitating a flow of clean grain through and further promoting an increased flow of air through the sieve to enhance separation of unwanted residue from the clean grain. The first series of clean grain passages is relatively narrow in a first direction to achieve the desired degree of material grading and elongated in a second direction extending normal to the first direction. The second series of clean grain passages is relatively narrow in both directions so as to effect a desired separation of the materials and grain while promoting a flow of air upwardly through the sieve.

The improved cleaning system of the present invention is used in combination with a combine having a crop harvesting apparatus including an infeed mechanism attached to a forward end of the combine. The housing of the combine encloses a separating apparatus which, in the preferred embodiment, includes a generally cylindrical and at least partially foraminous rotor casing and a rotor. The rotor casing is provided with an inlet end arranged in crop-receiving relation with the infeed mechanism and an outlet end for residue. The rotor is journalled for rotation within the casing for threshing crop material introduced into the casing impelling threshed grain through the casing.

The cleaning system of the present invention comprises a fan mechanism and at least one and preferably two cleaning sieves. The fan is mounted for rotation about a fixed axis in the housing for generating a directed flow of air. In the illustrated embodiment, two cleaning sieves are located in the housing in vertically spaced relation relative to each other to receive material from the separating apparatus and such that the flow of air from the fan urges unwanted residue in the threshed grain into an airborne state for discharge downstream of the sieve. Each sieve is reciprocally mounted in the housing to arrange the materials thereon in a crop layer or mat.

Each sieve includes a plurality of adjustable louvers which are arranged in an adjacent relationship to each other. Preferably, each louver has a corrugated cross-sectional configuration defining a groove portion between adjacent ridge portions. A first series of clean grain passages is defined between confronting surfaces of adjacent louvers to allow clean grain to pass therethrough.

In a preferred embodiment, a majority of the louvers in the lower cleaning sieve define a series of openings defining a second series of clean grain passages which allow clean grain to pass through the sieve. This second series of clean grain passages furthermore facilitates an increased flow of air upward through the sieve to enhance separation of unwanted residue from the clean grain. In a most preferred form of the invention, each of the grain passages in the second series is sized to differentiate between clean wheat kernels and the material other than clean wheat kernels such as larger "white cap" objects. The second clean grain passage furthermore disallows the passage of longer pieces of straw or chaff that can currently lay flat and pass down through the first series of sieve openings if the louvers are opened wide enough to allow such passage.

The provision of a second clean grain passage through the sieve provides numerous advantages. First, the provision of an additional clean grain passage facilitates the flow of clean grain through the sieve. Second, the provision of a second clean grain passage allows the first series of clean grain passages to be tighter controlled without a resultant large volume of clean grain being returned to rethreshing. Moreover, the present invention offers improved productivity for the combine while maintaining an acceptable clean grain sample.

In addition to the above, the secondary clean grain passage in the sieve allows the sieve to be used in crops and conditions that do not require such fine cleaning. As will be appreciated, as the louvers are vertically adjusted, the openings defining the second clean grain passage become an insignificant formation on the sieve that neither helps nor significantly hinders the cleaning process. Therefore, the same sieve can be used for several crops, working much better in problematical small grain crops but having no significant effect on the larger kernel-sized crop.

Numerous other features and advantages of the present invention will become readily apparent from the following detailed description, the appended drawings, and the accompanied claims.

BRIEF DESCRIPTION OF THE DRAWINGS

FIG. 1 illustrates a perspective view, partially broken-away of a combine;

FIG. 2 is an enlarged partial cross-sectional side elevational view of a preferred separating apparatus and cleaning section of a combine;

FIG. 3 is a side elevational view of a cleaning sieve associated with the present invention;

FIG. 4 is an enlarged cross-sectional side elevational view of a cleaning sieve embodying principles of the present invention;

FIG. 5 is a fragmentary plan view of a cleaning sieve embodying principles of the present invention; and FIG. 6 is a sectional view taken along 6—6 of FIG. 5.

DETAILED DESCRIPTION OF A PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, there is shown in FIG. 1 a self-propelled combine 10. The combine 10 is preferably of the type marketed by the assignee herein and sold under Model No. 1600. The combine 10 includes a body or housing 12 supported on front drive wheels 14 and steerable rear wheels 16. The combine is powered by an engine (not shown) and controlled from an operator station 18. A crop harvesting apparatus or header 20 and an infeed mechanism 22 are attached at a forward end of the combine. The infeed mechanism 22 feeds the crop material to a separator apparatus 24 enclosed by housing 12.

Turning to FIG. 2, the separating apparatus 24 is preferably a conventional axial-flow type and includes a threshing cage 26 and a rotor 28. It should be appreciated, however, that the principles of the present invention equally apply to combines having a separating apparatus other than the axial-flow type. As illustrated, the threshing cage 26 has a generally cylindrically and at least partially foraminous configuration with the rotor 28 mounted for rotation therewithin. The rotor 28 is driven from the engine and directs crop material to be threshed from an inlet or upstream end 30 of the separating apparatus toward an exit or downstream end 32.

Between the upstream and downstream ends of the separating apparatus 24, crop or grain is threshed several times repeatedly, but gently, as it spirals around the single large diameter rotor 28 and passes through the threshing cage 6. In a conventional manner, suitable instrumentalities on the rotor 28 cooperate respectively with semicylindrical concaves 34 and semicylindrical grates 36 provided on the threshing cage 26 to thresh the crop material such that most of the grain will be separated and propelled downwardly through the concaves and grates.

Most of the grain drops into a grain pan 38. The grain is conveyed rearwardly from the pan 38 by an auger mechanism 40 for subsequent cleaning and collection. Straw, tailings and other waste material is impelled rearwardly out of the discharge end 32 of the separating apparatus 24 where a rotary beater 42 throws the straw and other waste material rearwardly from the combine.

The combine 10 further includes a cleaning system for cleaning chaff, straw, tailings and other foreign matter from the clean grain. The cleaning system includes a cleaning fan 44, a chaffer sieve 46, a grain sieve 48, and a clean grain collector 50. A suitable auger mechanism 52 directs clean grain from the collector 50 into a hopper (not shown).

Cleaning fan 44 extends transversely across substantially the entire width of the combine 10. More specifically, the fan 44 is transversely mounted for rotation within the housing 12 beneath the separator apparatus and forward of the cleaning sieves 46 and 48 for producing a directed flow of air. The cleaning fan 44 is of a conventional design and creates an airflow upwardly and rearwardly through the cleaning sieves 46 and 48 to urge unwanted chaff and other residue in the threshed grain into an airborne state and toward the discharge end 32 of the separating apparatus.

The chaffer sieve 46 and grain sieve 48 are arranged in vertically spaced relation to each other and are substantially similar in construction to each other. Accordingly, and for purposes of succinctness and brevity, only grain sieve 48 will be discussed in detail with the understanding that chaffer sieve 46 is substantially similar.

Each sieve is supported in the housing 12 beneath the separating apparatus 24 for receiving and sifting threshed grain received from the grain pan 38. Each sieve is located in the housing 12 such that the flow of air from the fan 44 passes upwardly therethrough to urge residue in the threshed grain into an airborne state and toward the discharge end of the separating apparatus 24 and away from the sieve. As illustrated, each sieve is supported for fore-and-aft reciprocation or oscillation by a pair of arms 56 and 58. As will be appreciated, reciprocation of the sieve facilitates arrangement of the crop material over the entirety of the sieve and tends to separate the clean grain from the chaff, straw, tailings and other residue materials so that the clean grain falls through the sieve.

As illustrated in FIGS. 3 and 4, each sieve includes a generally rectangular frame 60 with a series or plurality of transversely elongated louvers or slats 62 arranged in an adjacent relationship to each other. As illustrated in FIG. 4, each louver 62 has a central portion 64 with two leg portions 66 and 68 extending in angularly offset directions therefrom. A transversely elongated pivot rod 70 is connected to the central portion of each louver and controls the angular disposition thereof. Opposite ends of each pivot rod 70 are rotatably supported by the frame 60. Intermediate its ends, each pivot rod has a depending arm 72 which engages with a linearly displaceable adjustment mechanism 74 including an endwise movable member 76. As will be appreciated, endwise movement of the adjustable member 76 will result in rotational movement of the pivot rod about its longitudinal axis and, thus, angular displacement of the louvers 62.

As illustrated, leg portion 68 of each louver 62 is provided with a major upper surface 78 and a major lower surface 80. As seen in FIG. 3, a first series of clean grain passages 82 is defined between confronting upper and lower surfaces of adjacent louvers. As will be appreciated, each grain passage in the first series of clean grain passages is relatively narrow in a first or widthwise direction and is transversely elongated in a lengthwise second direction; with the second direction extending generally at right angles or normal to the first direction. The widthwise dimension of the first series of clean grain passages can be adjusted by modulating the angular displacement of the louvers relative to each other.

As illustrated in FIGS. 5 and 6, each louver 62 preferably has a corrugated cross-sectional configuration. The corrugated cross-sectional configuration of each louver provides a lower groove portion 84 between raised and adjacent ridge portions 86.

Each leg portion 68 of the majority of the louvers 62 is provided with a series of transversely spaced openings 88 defining a second series of clean grain passages. The openings 88 are preferably located in the groove portion 84 of the louvers such that clean grain has a tendency to gravitate toward the opening 88 and pass therethrough. In the illustrated embodiment, only the louvers 62 in the grain sieve 48 are provided with openings 88.

As illustrated, each of the openings 88 defining the second series of clean grain passages is relatively narrow in both directions to inhibit other than clean grain from passing therethrough. As will be appreciated, the size of the openings can be particularly suited for a particular grain application. In the illustrated embodiments, the openings defining the second series of grain passages are sized to differentiate clean wheat kernels from material other than clean wheat kernels. Accordingly, the openings 88 have a diameter in the range of about 0.218 inches to about 0.289 inches. In a most preferred form, each of the openings in the second series of openings has a diameter of about 0.250 inches. Although a generally round opening is illustrated, it should be appreciated that other configurations of openings would likewise suffice. As will be appreciated, the ability of the opening 88 to allow clean grain to pass therethrough changes as a function of the angular orientation of the louver 62 relative to the horizontal.

In operation, the harvesting apparatus 20 reaps the grain stalks as the combine 10 is driven across the field. The infeed mechanism 22 delivers the crop material to the inlet end 30 of the separating apparatus 24. Cooperative instrumentalities on the separating apparatus 24 impel threshed grain from the separating apparatus into the grain pan 38 from whence the grain material moves onto the sieves 46 and 48. While the separating apparatus 24 acts to separate a substantial portion of the grain from the material other than grain, some chaff, straw, tailings, and etc. is directed out of the openings in the separating apparatus along with the grain and a further cleaning or separating action is required.

Subsequent cleaning of the crop material is facilitated by the air flowing from the fan 44 upwardly through the sieves. As will be appreciated, the air flows upwardly through the first series of openings or passages 82 defined between confronting upper and lower surfaces 78 and 80, respectively, of adjacent louvers 62 in the sieves. The space between confronting surfaces on the louvers also grades the material in a manner allowing clean grain to fall through the sieve and while moving the remaining material toward and off the end of the sieve.

As will be appreciated, the series of openings 88 in the louvers 62 defines a second or extra set of passages for allowing clean grain to pass through the sieve. Because the openings 88 are particularly sized only to allow clean grain to pass therethrough and provide a secondary or extra passage for the clean grain, the first series of passages 82 can be adjusted to a tighter tolerance without a resultant large volume of clean grain being returned to rethreshing. Ultimately, improved productivity results while maintaining an acceptably clean sample of grain in the collection chamber 50.

An added benefit of the present invention is that the same sieve may be used for crops and conditions that do not require the first series of passages 82 to be tightly toleranced. As the louver 62 is angularly adjusted relative to the horizontal, the openings 88 become an insignificant formation that neither helps nor hinders the cleaning process. For this reason, the same sieve can be used for several crops. While working much better in problematic small grain crops, use of an apertured sieve according to the present invention has no adverse effect on grain materials with a larger kernel size. Moreover, the second series of openings 88 facilitates an increased flow of air through the sieve to enhance separation of unwanted residue from the clean grain. Accordingly, the additional flow of air through the sieves enhances the force acting to urge the residue material into an airborne state and toward the outlet of the separating apparatus to enhance the cleaning apparatus.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cleaning system for a combine having a housing enclosing a separating apparatus capable of threshing grain from crop material, said cleaning system comprising:
   fan means mounted within said housing for producing a flow of air; and
   sieve means located in said housing to receive threshed grain from said separating apparatus and such that the flow of air from said fan means urges unwanted residue in said threshed grain into an airborn state for discharge downstream of said sieve means, said sieve means including a series of louvers which are arranged relative to each other to define a first series of grain passages therebetween allowing clean grain to pass through said sieve means, and wherein a plurality of said louvers define a series of apertures, with each aperture having a closed margin formed by a portion of the louver, and wherein said apertures define a second series of grain passages allowing clean grain to pass through said sieve means and which facilitate an increased flow of air through said sieve means to enhance separation of unwanted residue form said clean grain.

2. The cleaning system according to claim 1 wherein each of said grain passages in said first series is relatively narrow in a first direction and elongated in a second direction, with said second direction extending normal to said first direction, and wherein each of said grain passages in said second series is relatively narrow in both directions.

3. The cleaning system according to claim 1 wherein each of said apertures defining said second series of grain passages has a diameter in the range of about 0.218 inches to about 0.289 inches.

4. A cleaning system for a combine having a housing, a separating assembly mounted within said housing for threshing grain, said cleaning system comprising:
   fan means mounted in said housing for producing a directed flow of air; and
   reciprocally mounted sieve means located in said housing for receiving and sifting threshed grain and such that the directed flow of air from said fan means passes upwardly through said sieve means to urge unwanted residue in said threshed grain into an airborn state and toward an outlet of said combine, said sieve means including a plurality of adjustable louvers which are arranged in an adjacent relationship to each other such that a first series of clean grain passages is defined between confronting surfaces of adjacent louvers to allow clean grain to pass through said sieve means, and wherein a majority of said louvers define a series of apertures, with each aperture having a closed margin formed by a portion of the louver, and wherein said apertures combine to define a second series of clean grain passages allowing clean grain to pass through said sieve means and which facilitate the upward flow of air through said sieve means to enhance separation of unwanted residue from the clean grain.

5. A cleaning system for a combine having a housing, a separating assembly mounted within said housing for threshing grain, said cleaning system comprising:
   fan means mounted in said housing for producing a directed flow of air; and
   reciprocally mounted sieve means located in said housing for receiving and sifting threshed grain and such that the directed flow of air from said fan means passes upwardly through said sieve means to urge unwanted residue in said threshed grain into an airborne state and toward an outlet of said combine, said sieve means including a plurality of adjustable louvers which are arranged in an adjacent relationship to each other such that a first series of clean grain passages is defined between confronting surfaces of adjacent louvers to allow clean grain to pass through said sieve means, and wherein a majority of said louvers define a series of openings defining a second series of clean grain passages allowing clean grain to pass through said sieve means and facilitate the upward flow of air through said sieve means to enhance separation of unwanted residue from the clean grain, wherein each of said louvers has a corrugated cross-sectional configuration and wherein each of said openings in said series of openings is located in a groove portion defined between adjacent ridge portions defined by said corrugated configuration.

6. The cleaning system according to claim 4 wherein each of said openings in said series of openings has a diameter of about 0.250 inches.

7. A cleaning system for a combine having a crop harvesting apparatus including an infeed mechanism attached to the forward end of the combine, a housing enclosing a separating apparatus capable of threshing crop material introduced into said separating apparatus and impelling threshed grain therefrom, said cleaning system comprising:

fan means mounted for rotation about a fixed axis for generating a directed flow of air;

a reciprocally mounted chaffer sieve located in said housing to receive and sift threshed grain and allow grain material to pass therethrough; and a reciprocally mounted grain sieve located in said housing beneath said chaffer sieve to receive grain material therefrom and such that the flow of air from said fan means passes upwardly therethrough toward said chaffer sieve to separate unwanted residue in said grain material into an airborne state, said grain sieve including a plurality of angularly adjustable louvers arranged in an adjacent relationship relative to each other such that a first series of clean grain passages is defined between upper and lower surfaces of adjacent louvers to allow clean grain to pass therethrough, and wherein said louvers define a series of apertures, with each aperture having a closed margin formed by a portion of the louver, said apertures defining a second series of clean grain passages allowing clean grain to pass through said grain sieve and which facilitate upward flow of air toward said chaffer sieve to enhance separation of unwanted residue from the clean grain.

8. A cleaning system for a combine having a housing, a separating assembly mounted within said housing for threshing grain, said cleaning system comprising:

fan means mounted in said housing for producing a directed flow of air; and reciprocally mounted sieve means located in said housing for receiving and sifting threshed grain and such that the directed flow of air from said fan means passes upwardly through said sieve means to urge unwanted residue in said threshed grain into an airborne state and toward an outlet of said combine, said sieve means including a plurality of adjustable louvers which are arranged in an adjacent relationship to each other such that a first series of clean grain passages is defined between confronting surfaces of adjacent louvers to allow clean grain to pass through said sieve means, and wherein a majority of said louvers define a series of openings defining a second series of clean grain passages allowing clean grain to pass through said sieve means and facilitate the upward flow of air through said sieve means to enhance separation of unwanted residue form the clean grain, wherein at least a portion of each of said louvers has a corrugated cross-sectional configuration, and wherein each of said openings in said series of openings is located on said corrugated configuration portion of said louvers.

* * * * *